(12) United States Patent  
Berkbuegler

(10) Patent No.: US 9,057,202 B2  
(45) Date of Patent: Jun. 16, 2015

(54) TREE STAND

(71) Applicant: Ronald L. Berkbuegler, Troy, IL (US)

(72) Inventor: Ronald L. Berkbuegler, Troy, IL (US)

(*) Notice: Subject to any disclaimer, the term of this patent is extended or adjusted under 35 U.S.C. 154(b) by 118 days.

(21) Appl. No.: 13/720,633

(22) Filed: Dec. 19, 2012

(65) Prior Publication Data

US 2014/0166400 A1  Jun. 19, 2014

(51) Int. Cl.  
*A01M 31/02* (2006.01)  
*E04G 3/00* (2006.01)

(52) U.S. Cl.  
CPC . *E04G 3/00* (2013.01); *Y10T 24/39* (2015.01); *A01M 31/02* (2013.01)

(58) Field of Classification Search  
CPC .............................. A01M 31/02; Y10T 24/39  
USPC ............... 182/128, 133–136, 187; 72/502.4; 24/116 A, 128, 130, 131 C  
See application file for complete search history.

(56) References Cited

U.S. PATENT DOCUMENTS

| | | | |
|---|---|---|---|
| 2,060,953 A | 11/1936 | Strom | |
| 2,168,111 A | 8/1939 | Barnes | |
| 3,743,050 A | 7/1973 | Danz | |
| 4,549,635 A | 10/1985 | Early | |
| 4,782,918 A | 11/1988 | Brunner et al. | |
| 4,995,475 A | 2/1991 | Berkbuegler | |
| 5,143,177 A * | 9/1992 | Smith | 182/187 |
| 5,363,941 A * | 11/1994 | Richard | 182/187 |
| 5,379,861 A | 1/1995 | Amacker | |
| 5,409,083 A | 4/1995 | Thompson et al. | |
| 5,462,135 A | 10/1995 | Ambler et al. | |
| 5,469,934 A | 11/1995 | Pherigo | |
| 5,562,180 A * | 10/1996 | Herzog et al. | 182/187 |
| 5,588,499 A | 12/1996 | Carriere | |
| 5,628,383 A | 5/1997 | McIntyre | |
| 5,791,022 A * | 8/1998 | Bohman | 24/130 |
| 5,791,436 A | 8/1998 | Talley, Sr. | |
| 5,848,666 A | 12/1998 | Woodall et al. | |
| 5,862,883 A | 1/1999 | Carriere | |
| 5,975,242 A * | 11/1999 | Woller et al. | 182/187 |
| 6,085,868 A | 7/2000 | Anthony et al. | |
| 6,102,158 A | 8/2000 | Winschel | |
| 6,182,792 B1 * | 2/2001 | Woller et al. | 182/187 |
| 6,397,973 B1 * | 6/2002 | Woller | 182/187 |
| 6,588,546 B1 * | 7/2003 | Forrest | 182/135 |
| 6,595,325 B2 * | 7/2003 | Ulrich | 182/136 |
| 6,715,585 B1 * | 4/2004 | Overbaugh | 182/187 |
| 6,722,472 B2 | 4/2004 | Berkbuegler | |
| 7,544,120 B1 * | 6/2009 | Tardif et al. | 452/187 |
| 7,802,654 B2 * | 9/2010 | Tolliver et al. | 182/136 |
| 2004/0238279 A1 * | 12/2004 | Johnson | 182/136 |

(Continued)

*Primary Examiner* — Charles A Fox  
*Assistant Examiner* — Kristine Florio  
(74) *Attorney, Agent, or Firm* — Senniger Powers LLP

(57) ABSTRACT

A cable-securement member secured to a platform includes a longitudinal passage extending through open first and second longitudinal ends and is sized and shaped for allowing the cable to move through the longitudinal passage from the first longitudinal end to the second longitudinal end. The longitudinal passage has a curved portion adjacent the second longitudinal end configured to resiliently bend a cable body of a cable as the cable enters the curved portion. The cable is configured to automatically rebound toward its unloaded state in the curved portion as a stop of the cable moves past the slot and exits the passage through the second longitudinal end so that the cable body exits the curved portion through a longitudinal slot and the stop is engageable with the cable-securement member to releasably lock the cable relative to the cable securement member.

13 Claims, 14 Drawing Sheets

(56) References Cited

U.S. PATENT DOCUMENTS

| | | | |
|---|---|---|---|
| 2005/0039985 A1* | 2/2005 | Butterworth | 182/187 |
| 2005/0145436 A1* | 7/2005 | Prejean | 182/136 |
| 2007/0227818 A1* | 10/2007 | Bedell | 182/136 |
| 2010/0089700 A1* | 4/2010 | Scudera et al. | 182/133 |

* cited by examiner

TREE STAND

BACKGROUND

The present invention generally relates to a tree stand.

Tree stands are used for supporting hunters, photographers, and nature enthusiasts at an elevated position in a tree to watch for game or observe wildlife. At that position, the view of the surrounding terrain is increased, a field of aim is improved, and the user is less likely to be seen by wildlife.

Unfortunately, it is typically difficult to attach a tree stand to a tree. The user must, while holding the platform in position adjacent to a tree trunk, move a chain or yoke around a back side of the tree trunk, secure and tighten it firmly against the tree. These tasks are cumbersome for the user because one hand is occupied supporting the platform. Any noise which is generated may alert nearby wildlife. Some tree stands have a limp chain which is both noisy and awkward to secure. Further aggravating the difficulty is that the user is frequently at an uncomfortable position, standing on a branch of a tree in a dark, wet or cold environment. These tasks are potentially hazardous, and many users have inadvertently fallen and received injury.

Another drawback of conventional tree stands is that they are limited for use on trees which are nearly perfectly vertical. Some trunks or sections of trunks deviate from a vertical orientation by 10 degrees or more. A conventional tree stand is configured to align axially parallel with a tree trunk and engage the trunk generally facing a radial axis of the trunk to provide a stable attachment. When the tree trunk is slanted, the result is a laterally inclined platform which is uncomfortable and hazardous.

SUMMARY

In one aspect, a tree stand adapted for securement to a tree generally comprises a platform having opposite front and rear ends and opposite first and second sides. A brace is pivotally secured to the platform. A cable for securing the platform to the brace at an angle relative to the brace includes an elongate cable body having opposite first and second end portions. The cable body is resiliently bendable. At least one stop is on the cable body adjacent the second end portion of the cable body. A cable-securement member is secured to the platform adjacent the second side of the platform. The cable-securement member includes first and second opposite longitudinal ends, and a sidewall extending between the first and second longitudinal ends. A longitudinal passage extends through the first and second longitudinal ends and sized and shaped for allowing the cable to move through the longitudinal passage from the first longitudinal end to the second longitudinal end. The longitudinal passage has a curved portion adjacent the second longitudinal end configured to resiliently bend the cable body as the cable enters the curved portion. A longitudinal slot is in the sidewall of the curved portion of the longitudinal passage. The slot is configured to inhibit reception of the stop therein, and to allow the cable body to enter the slot from the curved portion of the longitudinal passage. The cable is configured to automatically rebound toward its unloaded state in the curved portion as the stop moves past the slot and exits the passage through the second longitudinal end so that the cable body exits the curved portion through the longitudinal slot and the stop is engageable with the cable-securement member to releasably lock the cable relative to the cable securement member.

In another aspect, a tree stand adapted for securement to a tree generally comprises a platform having opposite front and rear ends and opposite first and second sides, and a cable for securing the platform to the tree. The cable includes an elongate cable body having opposite first and second end portions. The cable body is resiliently bendable from an unloaded state. At least one stop is on the cable body adjacent the second end portion of the cable body. A cable-securement member is secured to the platform adjacent the second side of the platform. The cable-securement member includes first and second longitudinal ends, and a sidewall extending between the first and second longitudinal ends. A longitudinal passage extends through the first and second longitudinal ends and sized and shaped for allowing the cable to move through the longitudinal passage from the first longitudinal end to the second longitudinal end. The longitudinal passage has a curved portion adjacent the second longitudinal end configured to resiliently bend the cable body as the cable enters the curved portion. A longitudinal slot is in the sidewall of the curved portion of the longitudinal passage. The slot is configured to inhibit reception of the stop therein, and to allow the cable body to enter the slot from the curved portion of the longitudinal passage. The cable is configured to automatically rebound toward its unloaded state in the curved portion as the stop moves past the slot and exits the passage through the second longitudinal end so that the cable body exits the curved portion through the longitudinal slot and the stop is engageable with the cable-securement member to releasably lock the cable relative to the cable securement member.

In yet another aspect, a cable device for use with a tree stand having a platform with front and rear ends and first and second sides generally comprises a cable configured to extend from the first side to the second side of the platform. The cable includes an elongate cable body having opposite first and second end portions. The cable body is resiliently bendable. At least one stop is on the cable body adjacent at least the second end portion of the cable body. A cable-securement member for securement to the platform is adjacent the second side of the platform. The cable-securement member includes opposite first and second longitudinal ends, and a sidewall extending between the first and second longitudinal ends. A longitudinal passage extends through the first and second longitudinal ends and sized and shaped for allowing the cable to move through the longitudinal passage from the first longitudinal end to the second longitudinal end. The longitudinal passage has a curved portion adjacent the second longitudinal end configured to resiliently bend the cable body as the cable enters the curved portion. A longitudinal slot is in the sidewall of the curved portion of the longitudinal passage. The slot is configured to inhibit reception of the stop therein, and to allow the cable body to enter the slot from the curved portion of the longitudinal passage. The cable is configured to automatically rebound toward its unloaded state in the curved portion as the stop moves past the slot and exits the passage through the second longitudinal end so that the cable body exits the curved portion through the longitudinal slot and the stop is engageable with the cable-securement member to releasably lock the cable relative to the cable-securement member.

Other aspects of the present invention will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
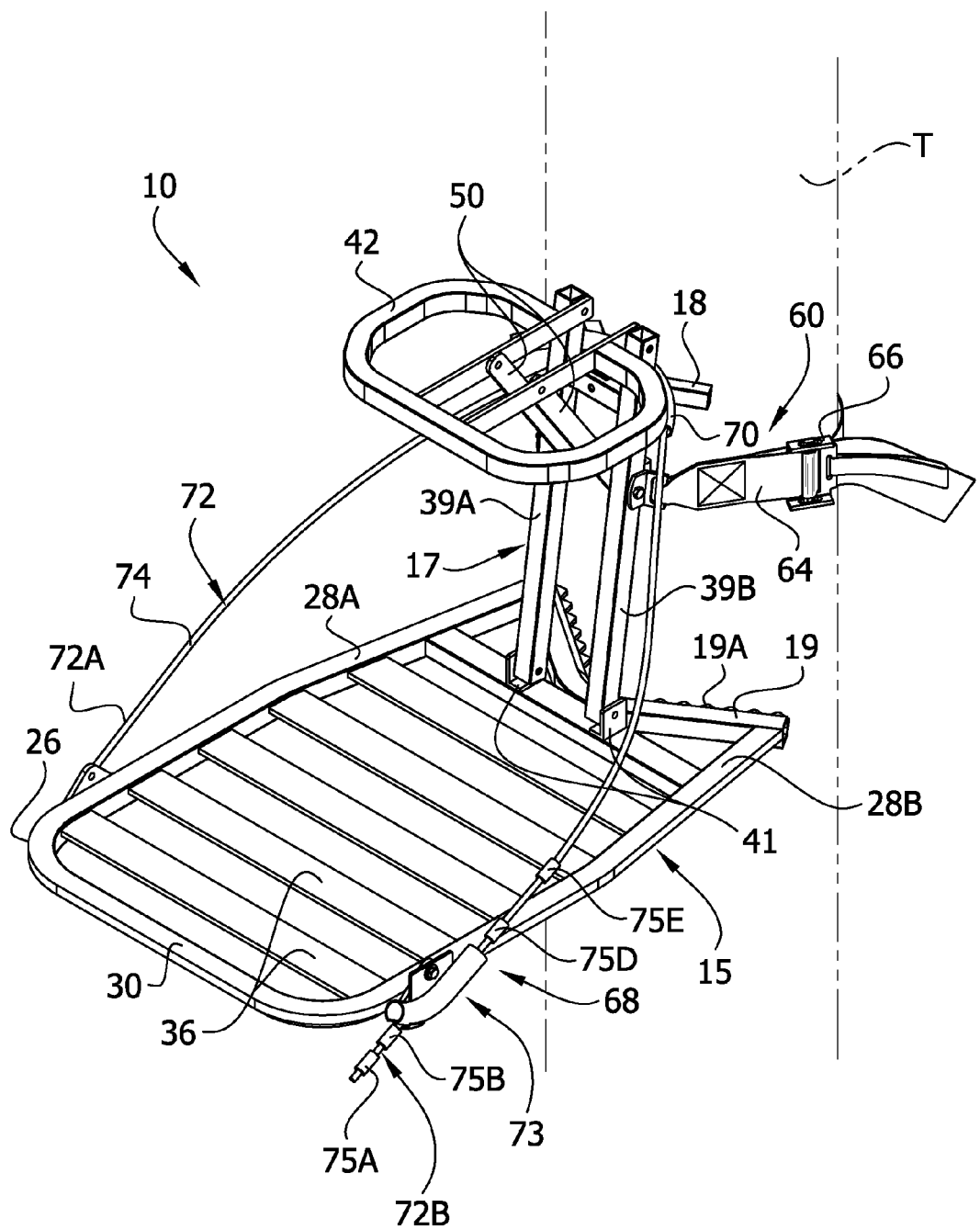
FIG. 1 is a perspective of a first embodiment of a tree stand secured to a tree.
Figure 2:
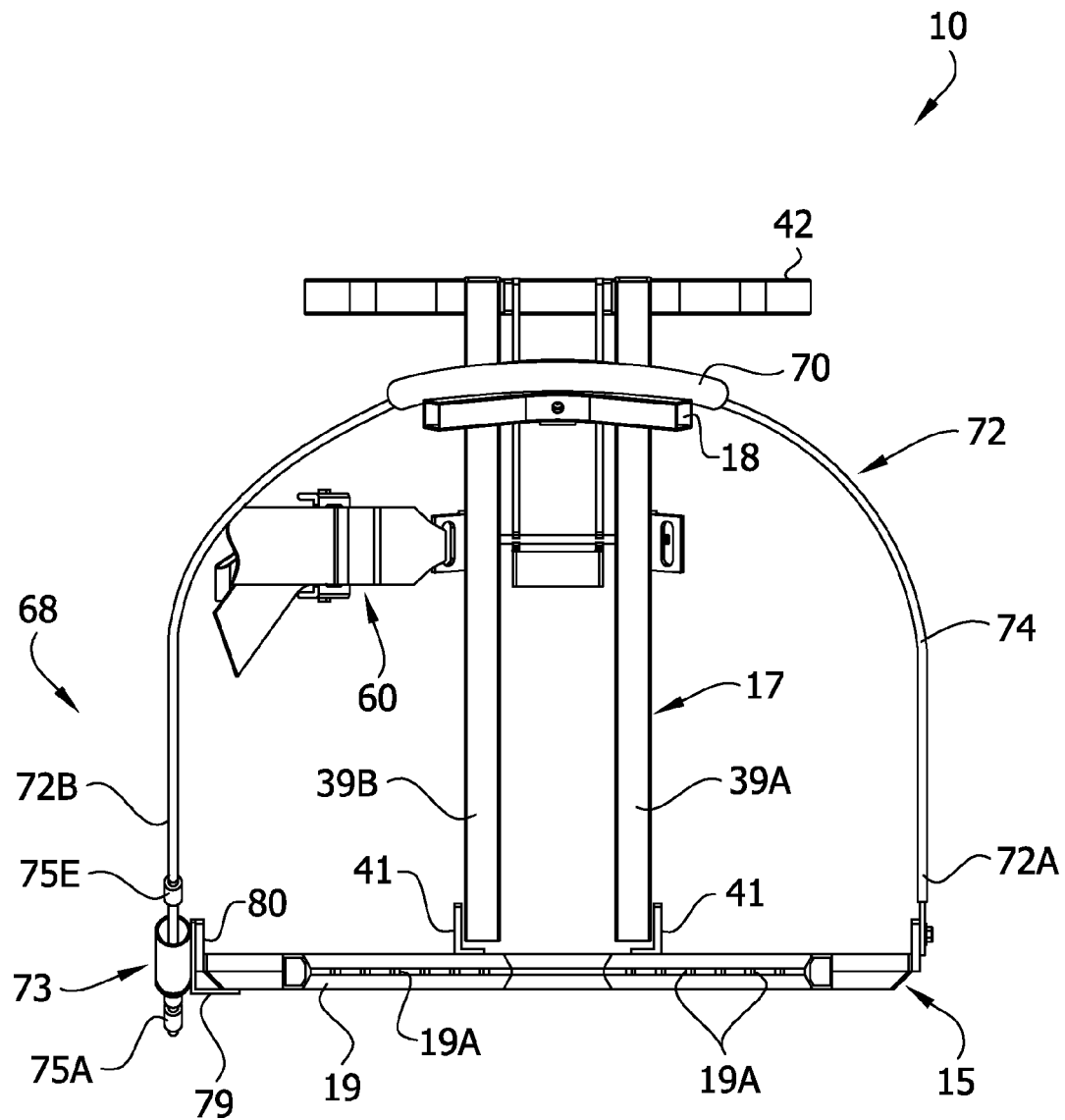
FIG. 2 is a rear elevation of the tree stand.
Figure 3:
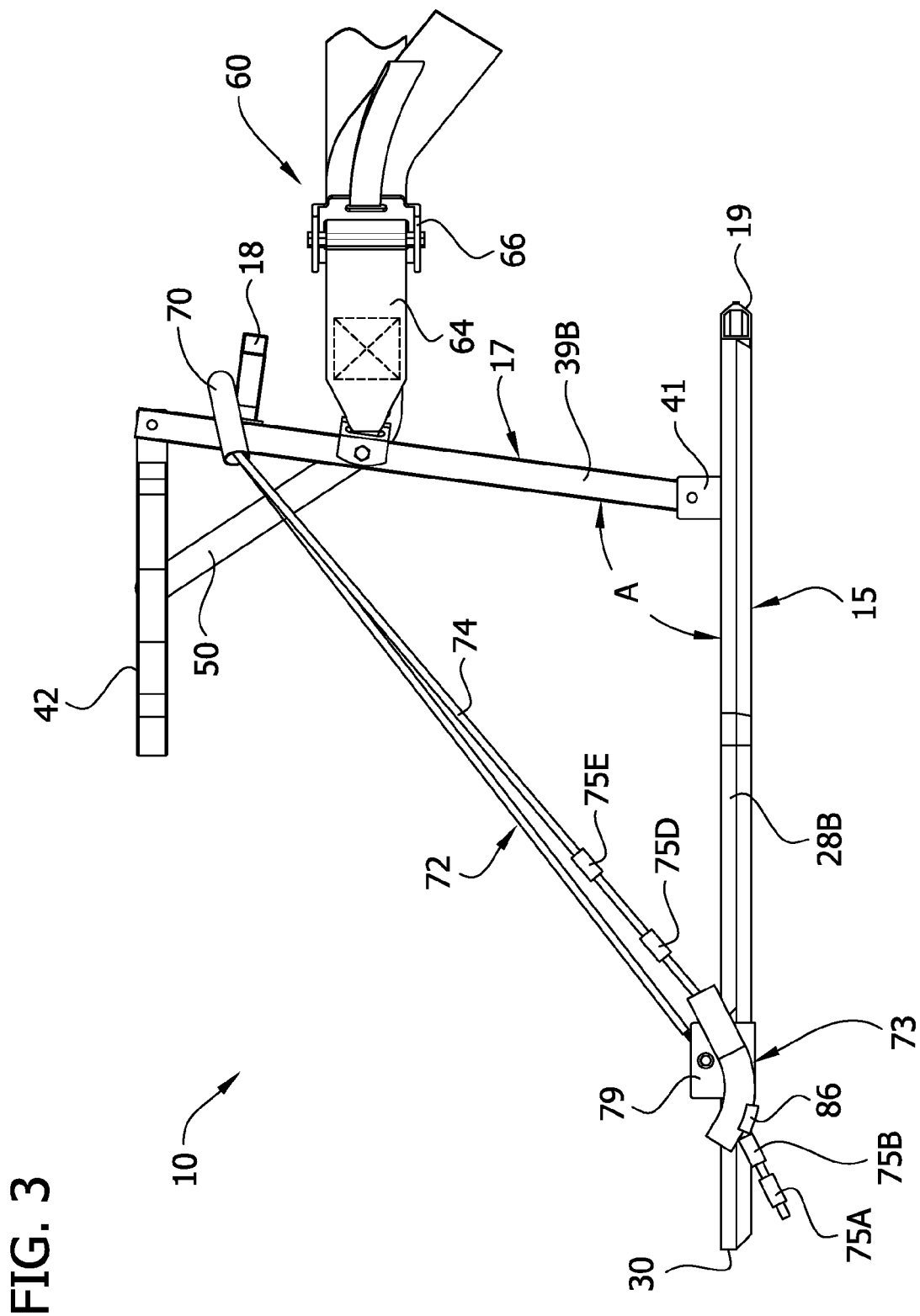
FIG. 3 is a right elevation of the tree stand.
Figure 4:
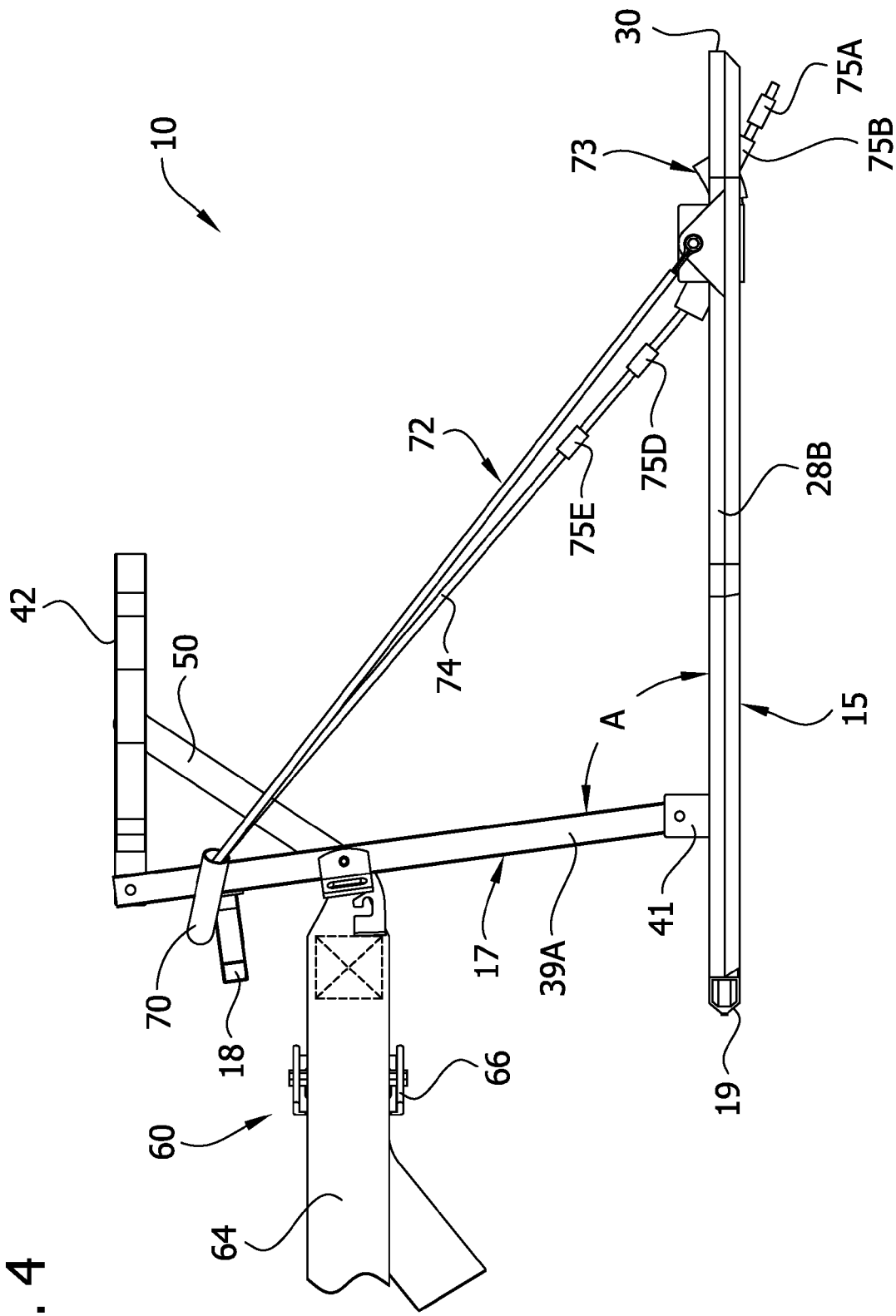
FIG. 4 is a left elevation of the tree stand.

Referring to FIG. 1, a first embodiment of a tree stand is designated in its entirety by the reference number 10. The tree stand adapted to be secured to a trunk of a tree T (FIG. 1). A tree stand is typically used by hunters to elevate themselves above their quarry. Referring still to FIGS. 1-4, the tree stand 10 comprises a platform, generally indicated at 15, and a generally elongate vertical brace, generally indicated at 17, pivotally secured to the platform and extending upward therefrom to form an angle A (FIGS. 3 and 4) with respect to the platform. As will be disclosed more fully hereinafter, the angle A between the platform 15 and brace 17 can be changed to keep the platform in a generally horizontal position on the tree T. The brace 17 is secured directly to the tree trunk T such that a concave (e.g., U-shaped or V-shaped) bracket 18 of the brace engages the tree. In addition, a curved foot 19 extending from a rear end of the platform 15 engages the tree, and the platform extends outward from the tree T.

The platform 15 of the illustrated embodiment comprises a frame 26 having a pair of laterally spaced first and second side members 28A, 28B defining first and second sides of the platform, and a front cross member 30 (FIGS. 1 and 2) defining a front end of the platform. As illustrated, the frame 26 is formed of a single piece of channel bent into a shape that is generally tapered toward the curved foot 19. Slats 36 extend between the side members 28A, 28B to form a generally planar top surface on which, for example, the user's feet rest. As described above, the foot 19 of the platform 15 extends rearwardly from the rear end of the platform 15 for engagement with the tree T. The foot 19 is generally concave to accommodate some curvature of the tree T, although other shapes are within the scope of this invention. In a preferred embodiment, foot 19 includes rigid teeth 19A integrally formed into its inner curvature. The teeth 19A grip the surface of the tree T to prevent movement of platform 15 with respect to the tree. Preferably, the entire platform 15 is constructed of metal or other rigid material.

The brace 17 of the illustrated embodiment is pivotally secured to the platform 15 at a lower end and projects up from the platform (FIGS. 1-4). A pair of spaced apart columns 39A, 39B of the brace 17 are pivotally attached to the platform 15 by respective bolts (not shown) extending through angle brackets 41 that are secured to a cross brace 42 arranged parallel to slats 36. Preferably, the entire brace 17 is constructed of metal or other rigid material. A seat 42 having a front and a rear end is pivotally attached to the top of the rear columns 39A, 39B at a rear end of the seat. Although not shown, the seat 42 may include a cushion or other structure on which the user sits. The front end of the seat 42 is supported by struts 50 when the tree stand 10 is in use. The struts 50 are pivotally attached to the seat 42 and releasably securable to the brace 17, such as by hooks on the struts. The struts 50 allow the angle at which the seat 42 extends from the brace 17 to be adjusted. An alternative seat support mechanism is described in U.S. Pat. Appl. No. 2007/0000726, entitled "Platform Assembly," which is hereby incorporated by reference. Still other seat support mechanisms could be used without departing from the scope of this invention.

As shown best in FIG. 1, the platform assembly 10 is secured to the tree T using a tree securement device, generally indicated at 60. The securement device of the illustrated embodiment comprises a strap 64 having opposite ends secured to the brace 17, at least one of which is detachably secured to the brace. The strap 64 engages and extends around the tree T. The strap 64 has a buckle 66 for adjusting the length of the belt to accommodate differing diameters of trees. The securement device may include a chain or other device, rather than the strap 64, for securing the platform assembly 10 to the tree T. For example, a suitable securement device 60 is described in my U.S. Pat. No. 6,722,472, the entirety of which is herein incorporated by reference. It is understood that the securement device 60 may comprise other devices, besides a chain, such as a clamping yoke or other rigid member as taught in my U.S. Pat. No. 6,799,659 B2, the entirety of which is herein incorporated by reference. However, securement devices that do not extend around the support are also contemplated. For example, the platform assembly could be bolted directly to a support, or include a bracket that fits over a support.

The tree stand 10 includes a platform-adjustment mechanism (broadly, a cable device), generally indicated at reference numeral 68. The platform-adjustment mechanism 68 includes a cable guide 70 (e.g., a curved conduit) secured to the brace 17, a cable (generally indicated at 72) having a first end portion 72A pivotally attached to the first side (e.g., first side member 28A) of the platform 15 adjacent the front end and extending through the curved conduit 70, and a cable-securement member 73 secured to the platform adjacent the second side of the platform (e.g., second side member 28B) and configured for securing a second end portion 72B of the cable to the platform. In the illustrated embodiment, the curved conduit 70 is a rigid metal tube that has an inner diameter and an outer diameter. The curved conduit 70 of the illustrated embodiment is welded to the U-shaped bracket 18. The curved conduit 70 has a generally concave shape that is oriented in the opposite direction from the bracket 18. The curved conduit 70 has a first end and a second end, each of which is oriented in a slightly downward and frontward direct. The ends of the curved conduit 70 extend past the outer surfaces of columns 39A, 39B. It is understood that the guide 70 may be of other configurations. It is also contemplated that the tree stand 10 may include two cable-securement members 73 for adjustably securing both end portions 72A, 72B of the cable 72 to the platform 15.

As shown in FIGS. 1-4, the cable 72 comprises an elongate cable body 74, and a plurality of stops, e.g., swages 75A-75E, spaced apart from one other adjacent its second end portion 72B. In an unloaded state, the cable body 74 has a generally linear (i.e., straight) shape. However, the cable body 74 is resiliently deflectable (i.e., bendable) when a bending load is applied thereto, and is capable of rebounding to substantially its unloaded state when the load is removed. In one example, the cable body 74 may be formed of a braided steel wire, however, other resiliently bendable materials are also within the scope of this invention. The illustrated swages 75A-75E comprise generally cylindrical bodies (e.g., copper bodies) compressed or crimpled around the cable body 74 and spaced apart from one another along the length of the cable body. The swages 75A-75E have outer diameters that are larger than the outer diameter of the cable body 74. The outer diameters of the swages 75A-75E are sized to pass through curved conduit 70 without obstruction, although the outer diameters of the swages may be sized such that the swages cannot pass through the curved conduit. The longitudinal distances between adjacent swages 75B-75D are essentially equal, however, the longitudinal distance between swages 75A and 75B is substantially shorter because swage 75A does not perform a locking function like the other swages (as explained below). Instead, the swage 75A is meant to facilitate insertion of the cable 72 into the cable-securement member 73. In the illustrated embodiment, the cable 72 and the swages 75A-75E are covered in a shrunken heat shrinkable plastic tubing to protect the metallic materials from exposure to the elements.

Figure 5:
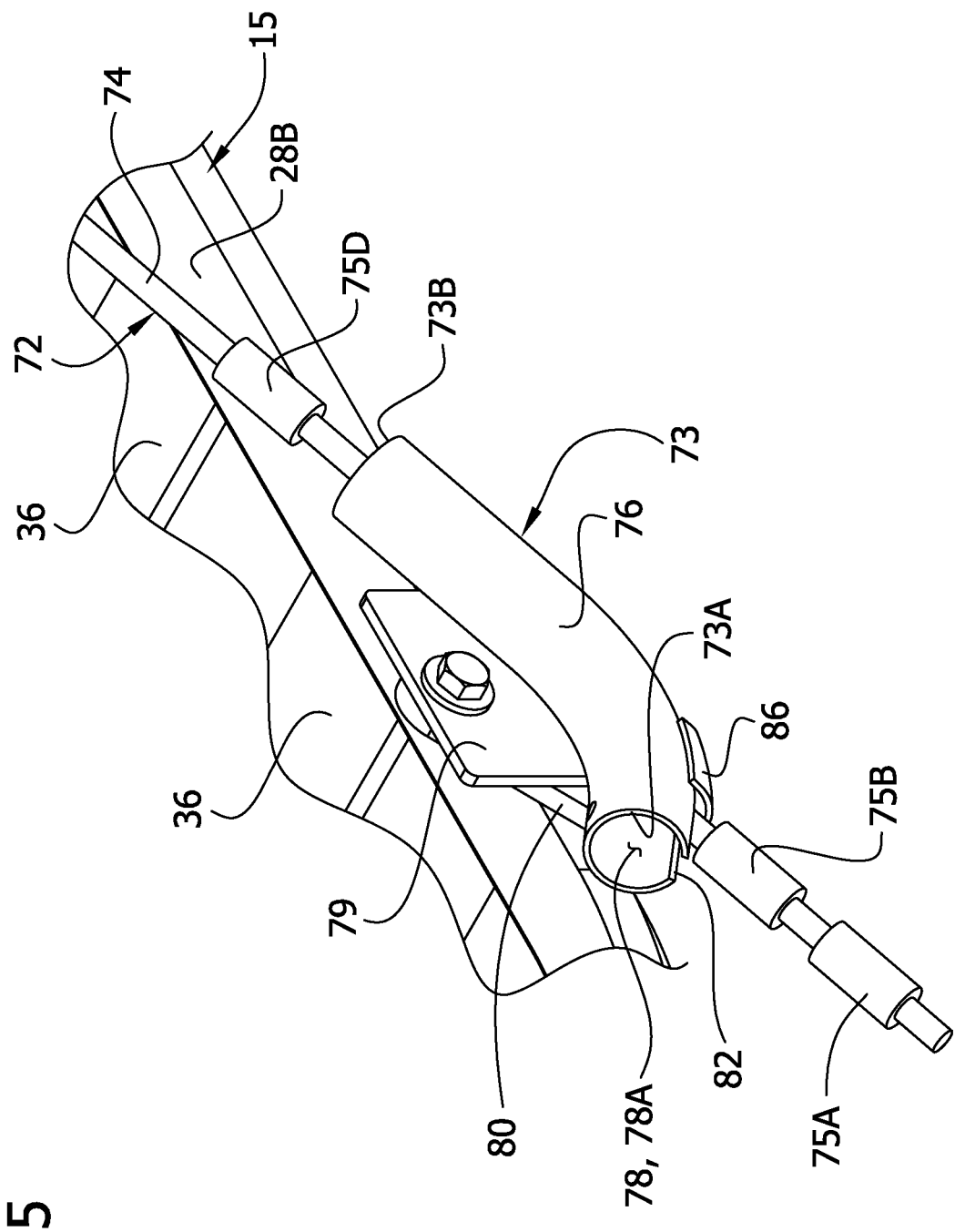
FIG. 5 is an enlarged, fragmentary perspective view of the right side of a platform of the tree stand showing a cable-securement member and a cable secured thereto in a locked position.
Figure 6:
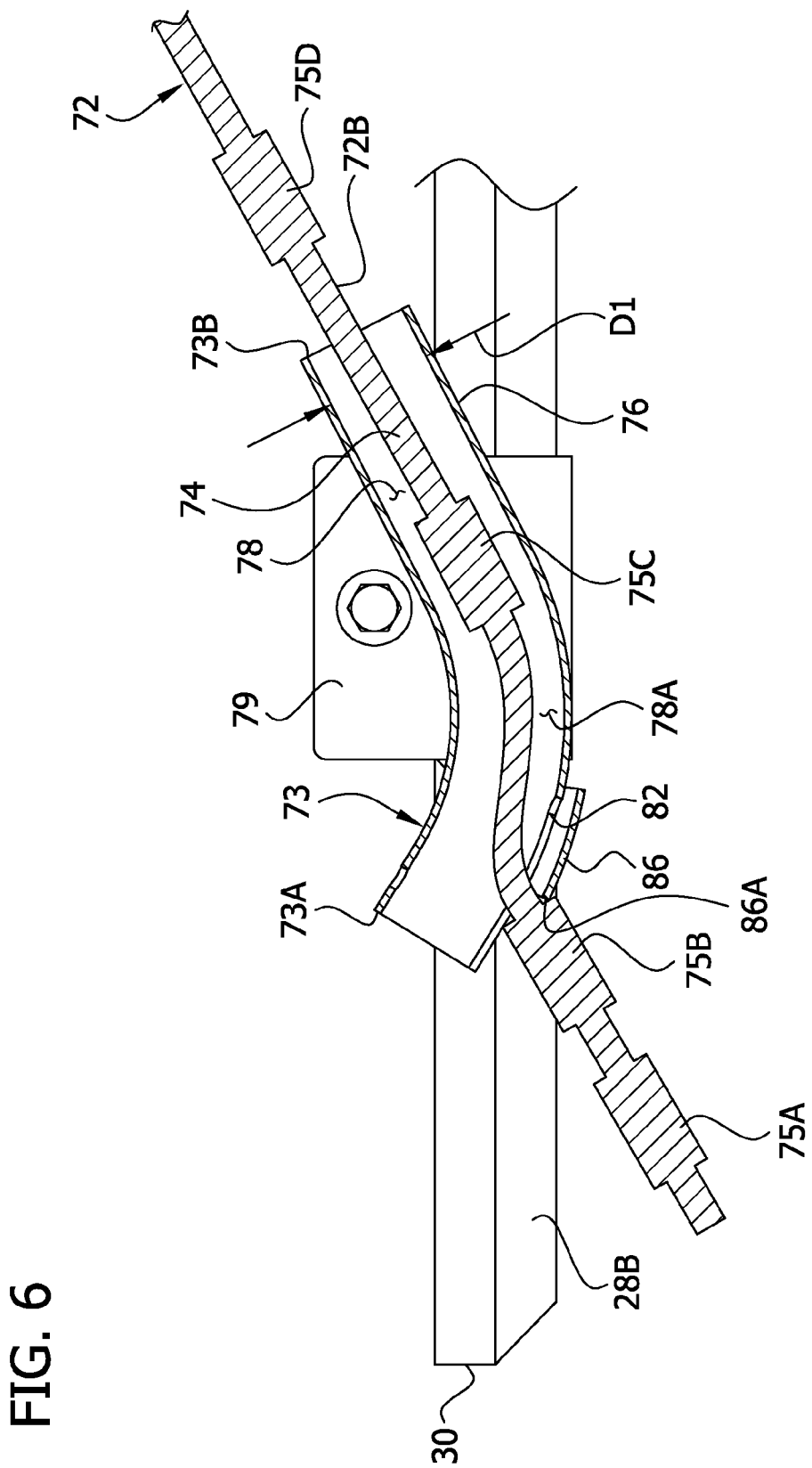
FIG. 6 is a longitudinal section of the cable-securement member and cable of FIG. 5.

Referring to FIGS. 5 and 6, the cable-securement member 73 has open rear and front longitudinal ends 73A, 73B (i.e., first and second longitudinal ends, respectively), a sidewall 76 extending between the front and rear longitudinal ends, and a longitudinal passage 78 extending through the front and rear longitudinal ends. In the illustrated embodiment, the cable-securement member 73 is a curved tube having a single, round sidewall 76, although the cable-securement member may have other shapes and more than one sidewall. A cross-sectional dimension D1 (FIG. 6) of the passage 78 (e.g., inner diameter of tube) is sized and shaped for slidably receiving the second end portion 72B of the cable 72, including the swages 75A-75E. The longitudinal passage 78 has a curved portion 78A (i.e., at least a portion of the passage is curved) adjacent the front longitudinal end 73A, which is curved relative to the portion of the passage adjacent the rear longitudinal end of the cable-securement member 73. In the illustrated embodiment, the curved portion 78A of the longitudinal passage 78 curves in a generally upward direction, although the longitudinal passage may curve in a different direction (e.g., laterally or downward). In the illustrated embodiment, the cable-securement member 73 is welded to an angle bracket 79 that is in turn fastened (e.g., bolted) to a bracket 80 secured to the platform 15. The cable-securement member 73 may be secured to the platform 15 in other ways.

Referring to FIGS. 5-9, the cable-securement member 73 includes a longitudinal slot 82 in the sidewall 76 and in registration with the curved portion 78A of the longitudinal passage 78. In the illustrated embodiment, the slot 82 extends through the front longitudinal end 73A and toward the second longitudinal end 73B. The slot 82 is sized and shaped to inhibit reception of the swages 75A-75E therein, while allowing the cable body 74 to enter, and therefore exit the cable-securement member 73, from the curved portion 78A of the longitudinal passage 78. As explained below when describing a method of adjusting the cable 72, the cable automatically locks in position (i.e., a locked position) after one of the swages 75B-75E moves past the slot 82 and through the first longitudinal end 73A of the cable-securement member 73. In general, the location of the longitudinal slot 82 in the sidewall 76 is opposite the direction that the longitudinal passage 78 curves. For example, in the illustrated embodiment, the longitudinal slot 82 is located at a lower portion or underside of the cable-securement member 73 because the curved portion 78A of the longitudinal passage 78 curves upward.

Figure 8:
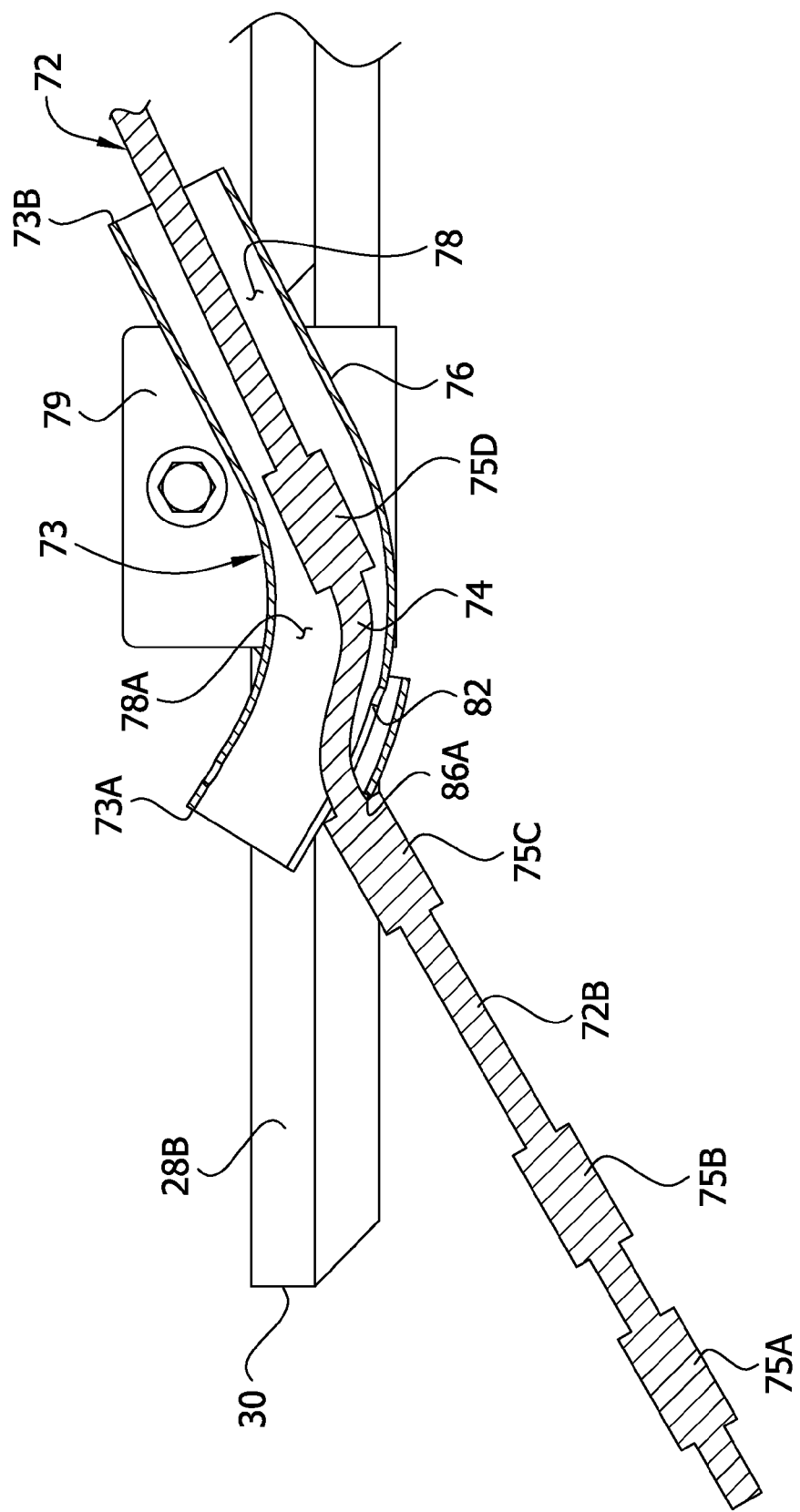
FIG. 8 is similar to FIG. 7, except the cable is moved to a locked position different from the locked position shown in FIG. 6.
Figure 9:
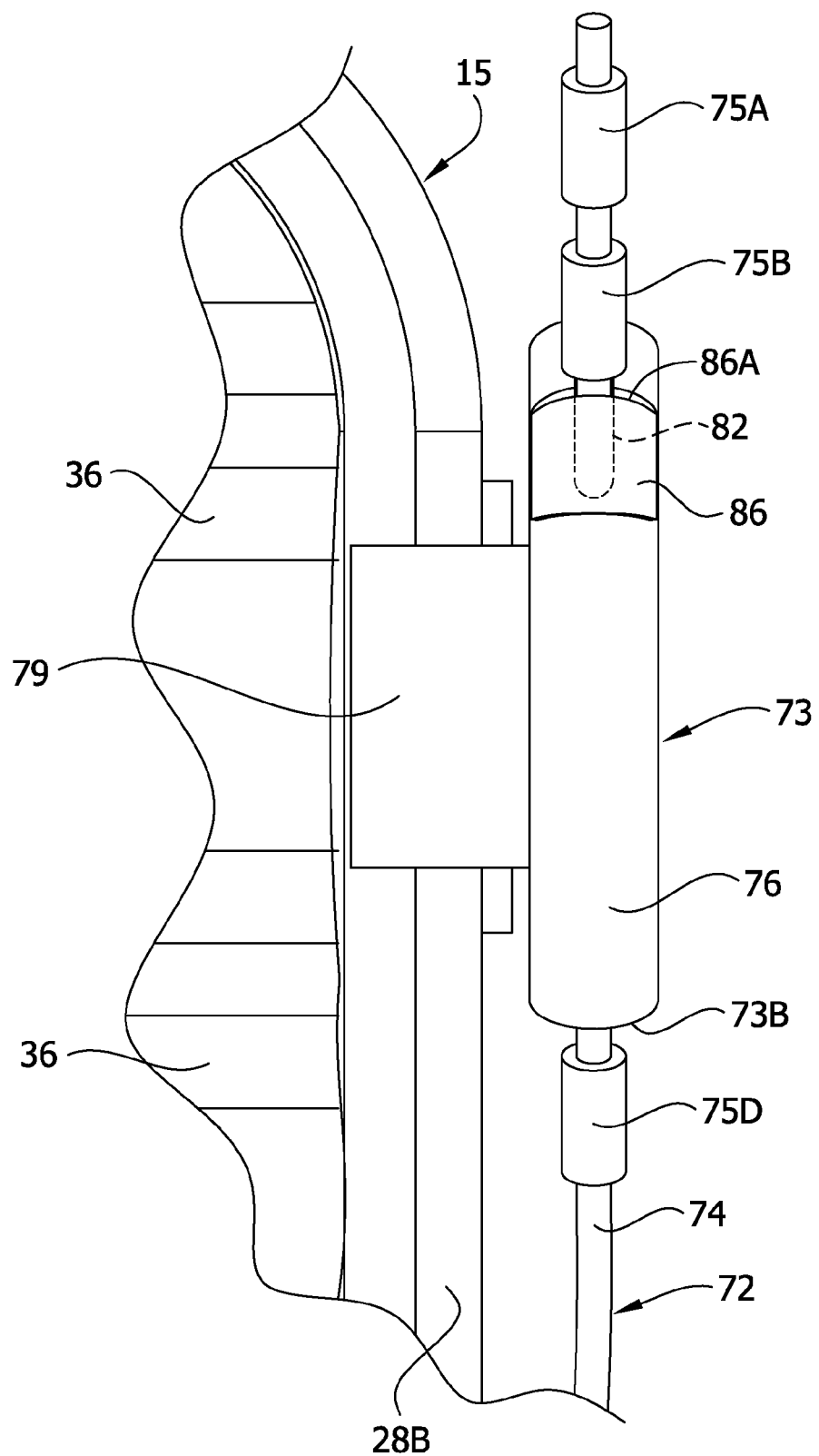
FIG. 9 is an enlarged, fragmentary bottom plan view of the right side of the platform of the tree stand showing a cable-securement member and a cable secured thereto in the locked position shown in FIG. 6.

For reasons explained below, the cable-securement member 73 also includes an arcuate extension member 86 secured to the exterior of the sidewall 76 in generally opposing relationship with the slot 82. As explained below, the extension member 86 has a front end 86A (i.e., an engagement surface) that one of the swages 75B-75E engages when the cable 72 is in the locked position (FIGS. 6 and 8). In the illustrated embodiment, the extension member 86 comprises a metal plate curved to a suitable radius of curvature for engaging the one of the swages 75B-75E when the cable 72 is in the locked position. The extension member 86 may be welded to the cable-securement member 80, or otherwise attached thereto, so that, as shown in FIG. 9, the extension member extends over and covers less than the entire length of the slot 82 (i.e., the extension member covers only a longitudinal portion of the slot). In another embodiment, the cable-securement member 73 does not include the extension member 86.

One example of a method of using the tree stand 10 will now be described. Before, during, or after securing the tree stand 10 to the tree T, it may be desirable to adjust the angle A between the platform 15 and the brace 17 to orient the platform in a generally horizontal position. The tree stand 10 permits a user to easily adjust the angle A between the platform 15 and the brace 17 by selectively adjusting the effective length of the cable 72. The effective length of the cable 72 is adjustable by unlocking the cable from the cable-securement member 73, moving the cable relative to the cable-securement member, and locking the cable relative to the cable-securement member when the platform 15 is in the desired position.

To initially secure the cable 72 to the cable-securement member 73, the second end portion 72B of the cable is inserted into the longitudinal passage 78 through the rear longitudinal end 73B of the cable-securement member 73. As the cable 72 is moved forward through the passage 78, the cable resiliently deflects (i.e., resiliently bends) as it moves through the curved portion 78A of the passage. As one of the swages (e.g., swage 75B in the Figures) slides past the longitudinal slot 82 and exits the open front longitudinal end 73A of the cable-securement member 73, the cable 72 automatically rebounds such that the cable body 74 (i.e., the portion of the cable body between adjacent swages) exits the passage 78 laterally through the longitudinal slot 82. As shown in FIG. 6, in this position the cable 12 is locked, and any rearward force or movement of the cable will cause a rear end of the swage 75B to contact the exterior of sidewall 76 of the cable-securement member 73 and the contact surface 86A of the arcuate extension 86. Thus, in the locked position, the cable 72 is inhibited from moving rearward relative to the cable-securement member 73, and the platform 15 is fixed in the angle A relative to the brace 17.

Figure 7:
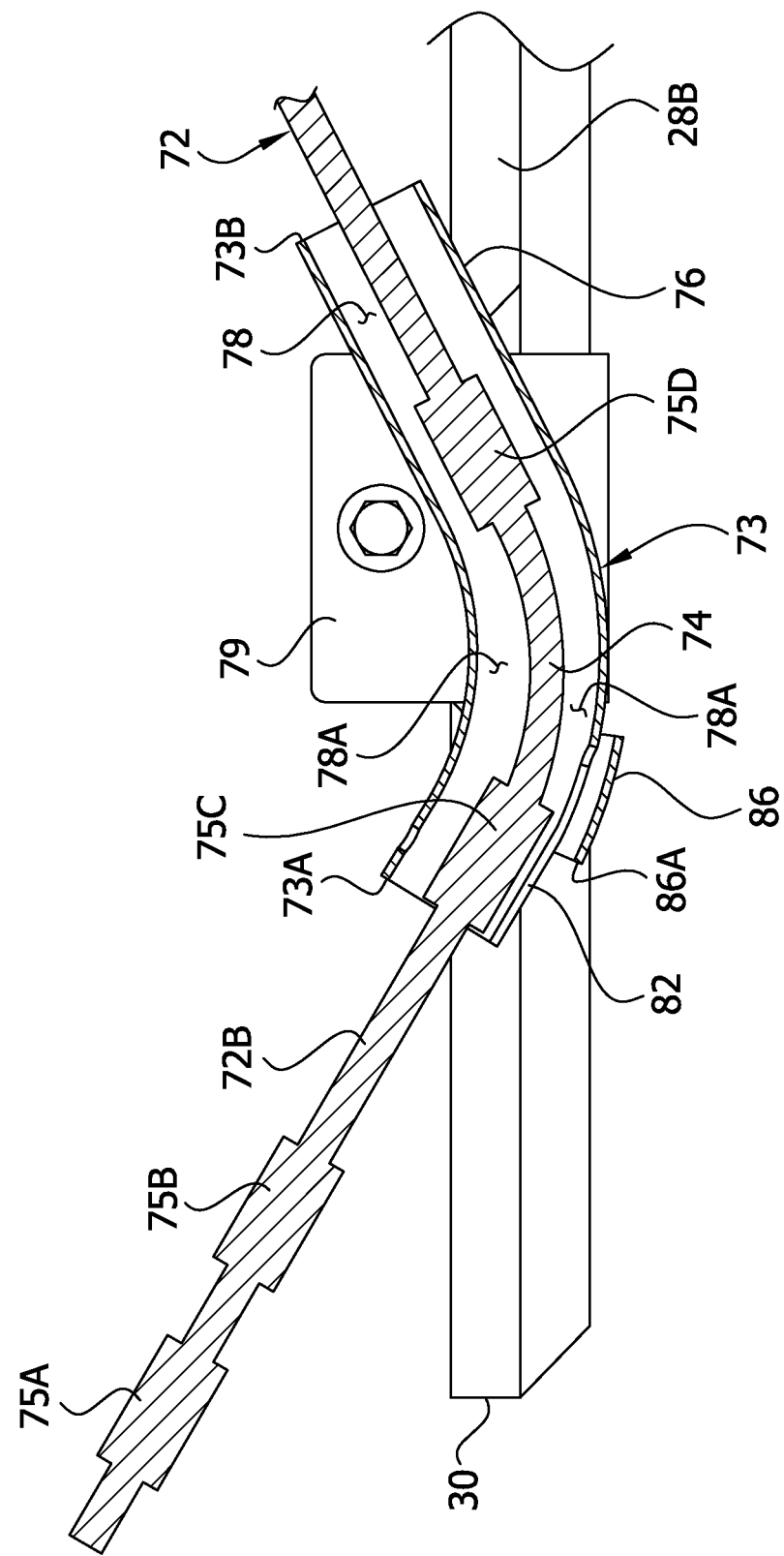
FIG. 7 is similar to FIG. 6, except the cable is moved to an unlocked position, which is forward of the position of the cable shown in FIG. 6.

Referring to FIG. 7, to shorten the angle A between the platform 15 and the brace 17, the cable 72 is moved forward in the longitudinal passage 78 so that the next swage (e.g., swage 75C) slides past the longitudinal slot 82 and exits the open front longitudinal end 73A of the cable-securement member 73. As shown in FIG. 8, after the swage 75C exits the front longitudinal end 73A, the cable 12 automatically rebounds so that the cable body 74 (i.e., the portion of the cable body between adjacent swages) exits the passage 78 laterally through the longitudinal slot 82. Each successive swage 75B-E reduces the effective length of cable 72 supporting the platform 15, which in turn reduces the angle A between the platform and the brace 17. Thus, a user may select the platform angle A by selectively engaging one of the swages 75B-E.

To increase the angle A between the platform 15 and the brace 17, the second end portion 72B of the cable that is outside the cable-securement member 73 is moved forward so that the engaged swage 75B-75E is forward of the longitudinal slot 82. Then the cable 72 is manually deflected so that the portion of the cable body 74 between the two adjacent swages 75B-75E is inserted back into the passage 78 through the longitudinal slot 82. The cable 72 can be pulled rearward through the passage 78 to allow another swage 75B-75E to engage the cable-securement member 73 and the extension member 86.

Figure 10:
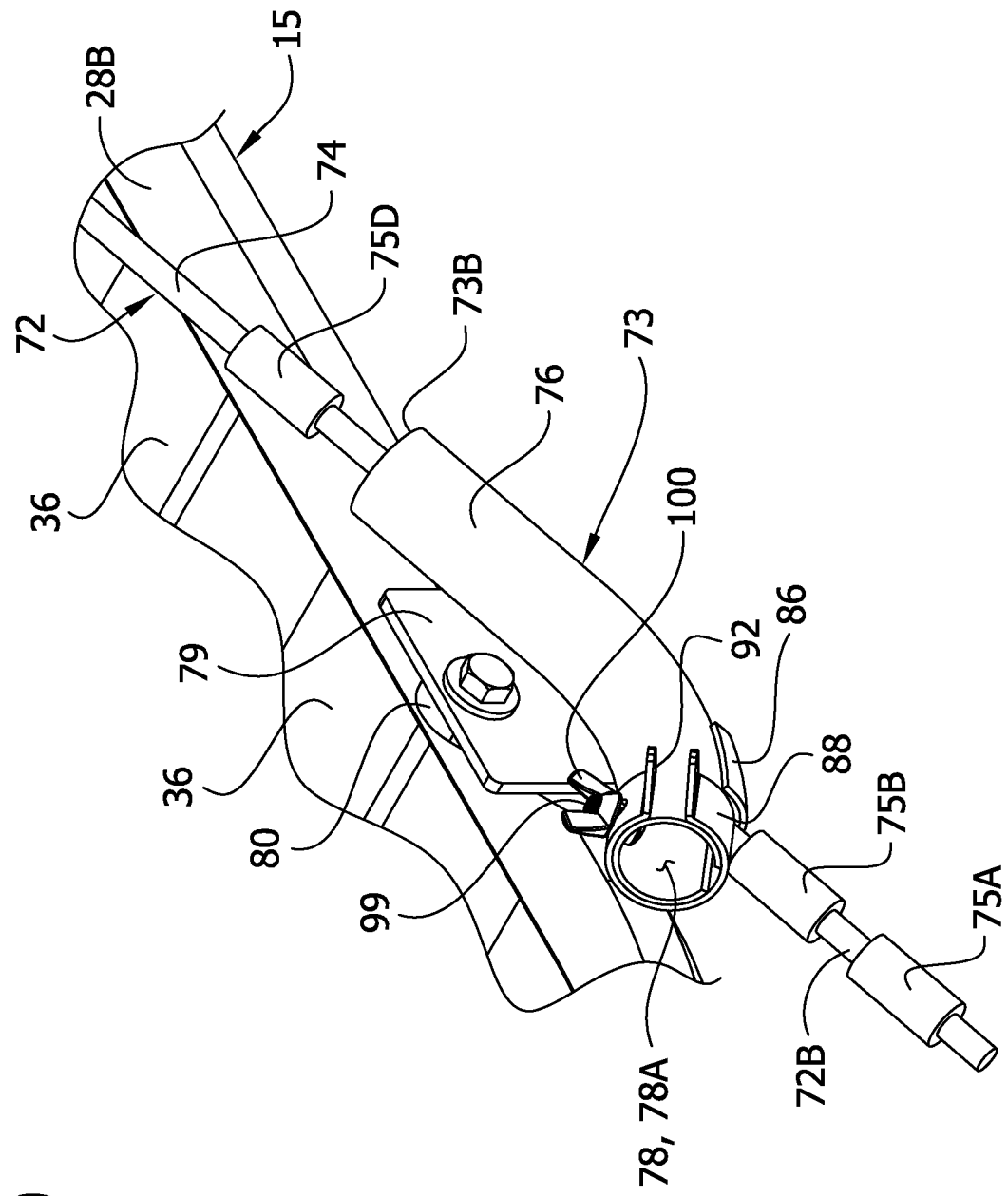
FIG. 10 is similar to FIG. 5, except the tree stand further includes an annular locking member on the cable-securement member in a locked position.
Figure 11:
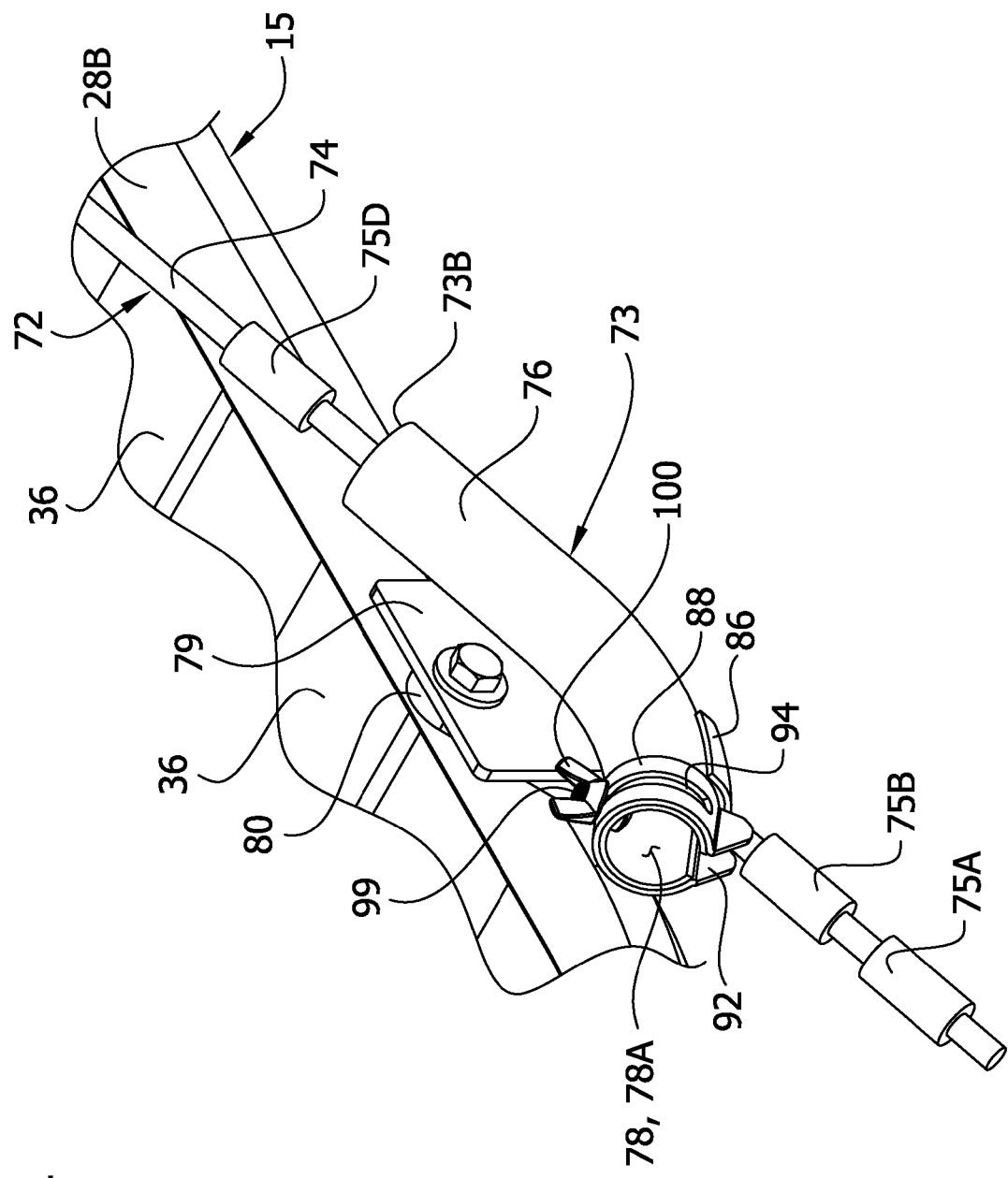
FIG. 11 is similar to FIG. 10, except the annular locking member is in an unlocked position.

Referring to FIGS. 10 and 11, in one embodiment the platform-adjustment mechanism 68 may include a generally annular locking member 88 rotatably received on front longitudinal end portion of the cable-securement member 73. The locking member 88 has a longitudinal opening 92 that is alignable radially with the longitudinal slot 82 in the cable-securement member 73. A threaded fastener 99 (e.g., bolt) extends through a circumferential slot 94 (FIG. 11) in the locking member 88, and a clamping device 100 (e.g., a wing-nut) is threaded on the fastener. Loosening the wing nut 100 allows for rotation of the locking member 88 relative to the cable-securement member 80, and tightening the wingnut inhibits rotation of the locking member relative to the cable-securement member. The locking member 88 is selectively rotatable about the cable-securement member 80 between an unlocked position (FIG. 11), in which the opening 92 is radially aligned with the longitudinal slot 82 to allow the cable 72 to be moved forward and reenter the passage 78 through the longitudinal slot, and a locked position, in which the opening 92 is out of alignment with the longitudinal slot and the locking member covers a portion of the longitudinal slot to inhibit the cable body 74 from reentering the passage through the longitudinal slot. Once a desired platform angle A is selected, the user may prevent any unintended disengagement of the selected swage 75B-75E with cable-securement member 80 by rotating the annular locking member 88 to the locked position and then tightening the wingnut 100 to inhibit rotation of the annular locking member. The platform-adjustment mechanism 68 may not include the annular locking member 88 without departing from the scope of the present invention.

Although not shown, the tree stand 10 may also include a fail-safe stop removably or permanently secured to the second end portion 72B of the cable. The fail-safe stop is removably securable to the second end portion of the cable to inhibit the second end portion of the cable from completely withdrawing from the cable-securement member. For example, the fail-safe stop may be secured to the second end portion 72B of the cable 72 after configuring the platform 15 in the desired angular position to inhibit the cable from withdrawing completely from the cable-securement member.

Figure 12:
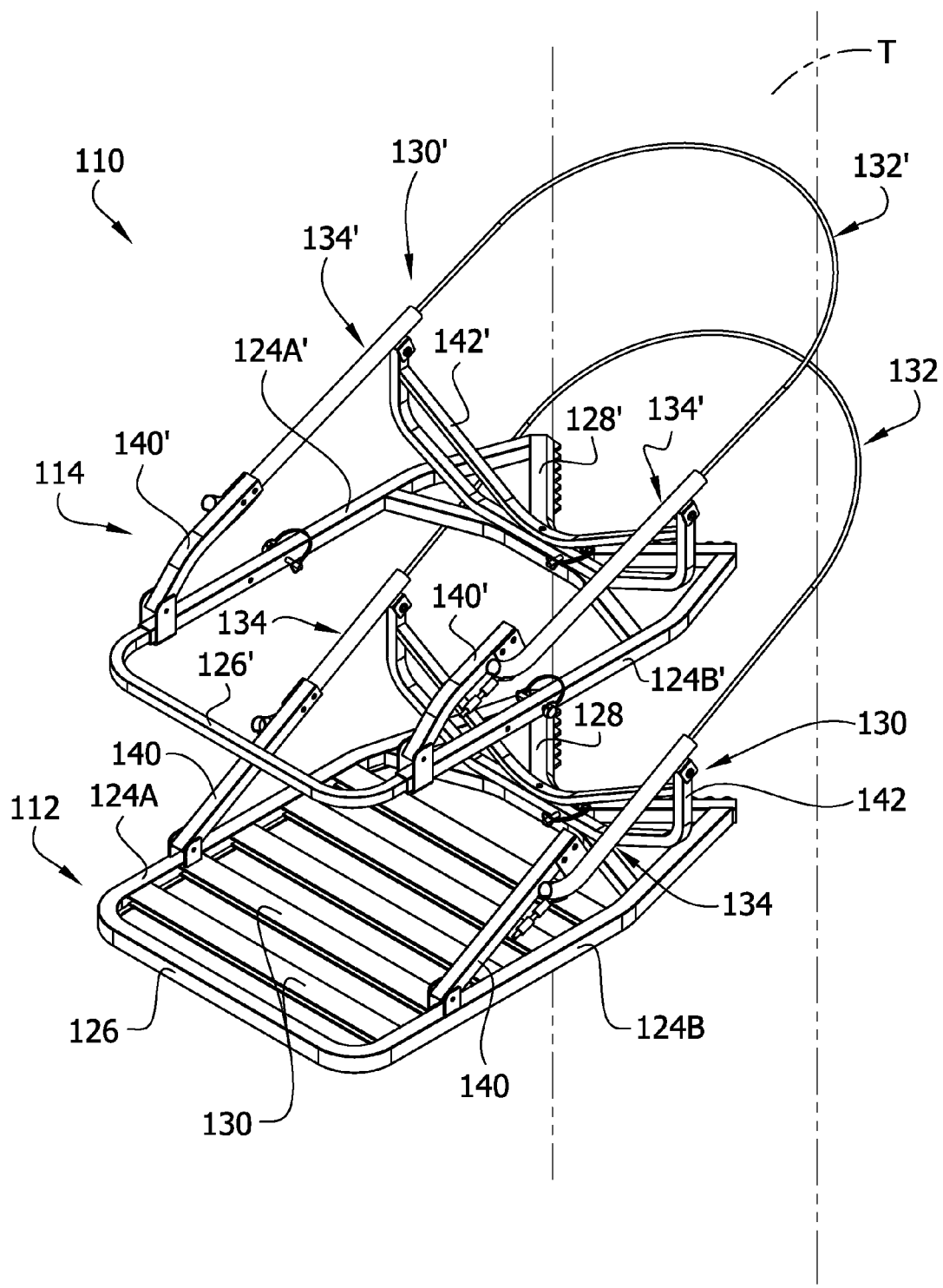
FIG. 12 is a second embodiment of a tree stand secured to a tree including a standing platform and a seat platform.
Figure 13:
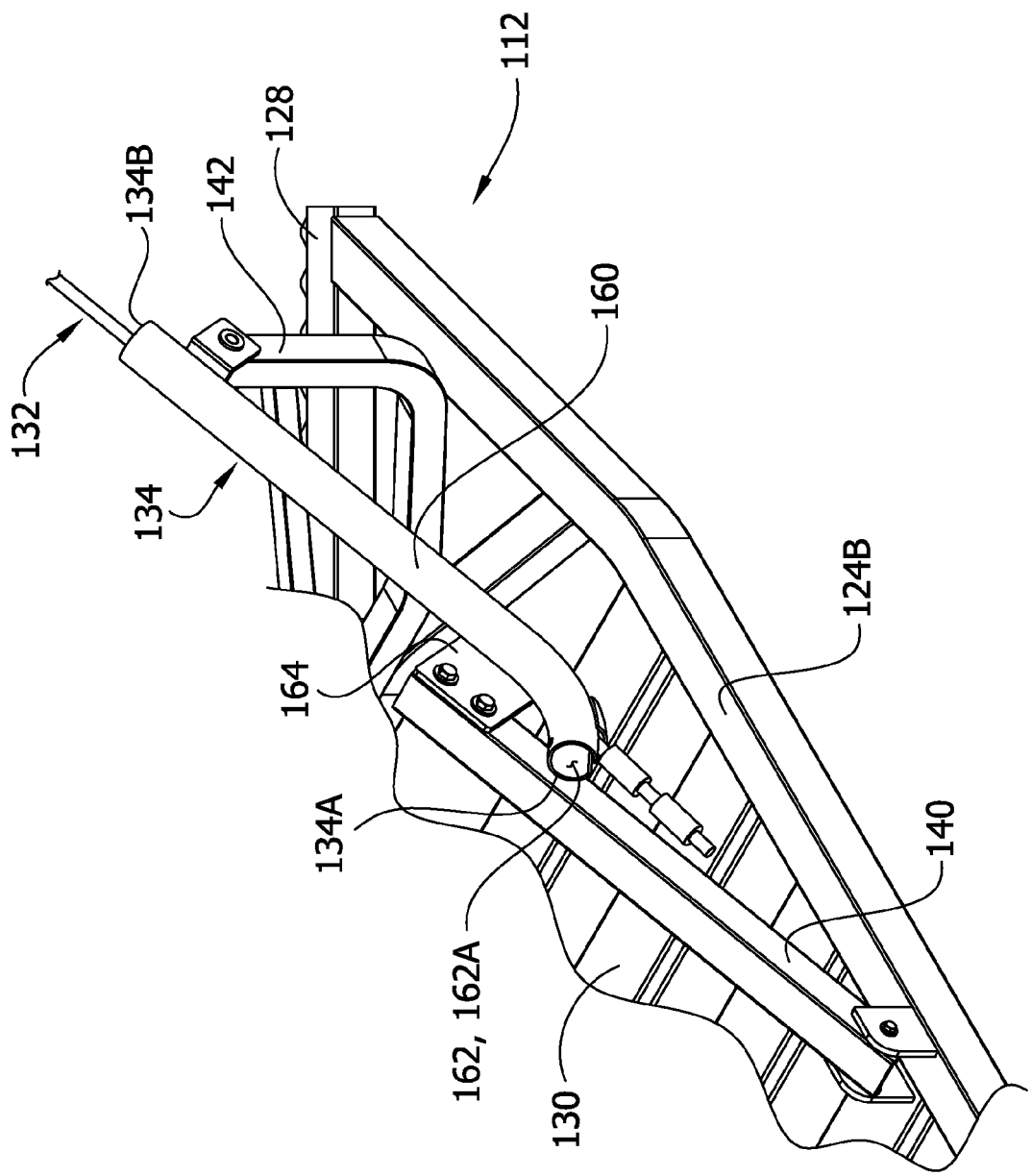
FIG. 13 is an enlarged, fragmentary perspective view of the right side of the standing platform of the tree stand showing a cable-securement member and a cable secured thereto in a locked position.
Figure 14:
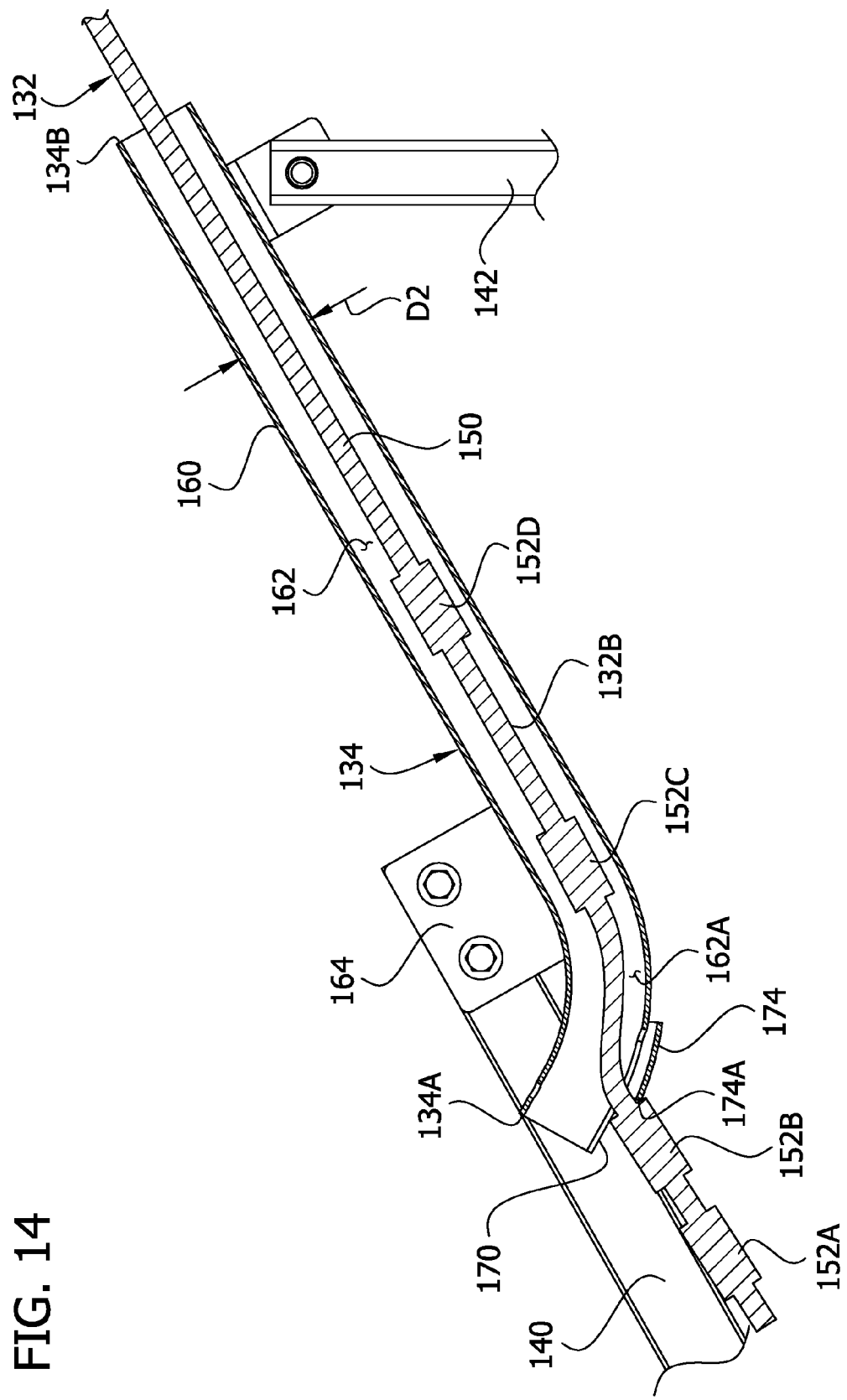
FIG. 14 is a longitudinal section of the cable-securement member and cable of FIG. 13.

Referring now to FIGS. 12-14, a second embodiment of a tree stand is designated in its entirety by the reference number 110. The illustrated tree stand 110 is a climbing tree stand that comprises a standing platform, generally indicated at 112, and a seat platform, generally indicated at 114. It is understood that the standing platform 112 and the seat frame 14 may be used together or may also be used separately from the other to support a sportsman above his quarry. Moreover, separate uses of the standing platform 112 and/or the seat platform 114 of the climbing tree stand 110 are within the scope of this invention.

The standing platform 112 and the seat platform 114 have similar structures. In particular, referring to FIG. 12 each of the platforms 112, 114 comprises a pair of laterally spaced elongate side members 124A, 124B and 124A', 124B', respectively, and a front cross member 126, 126', respectively. Curved feet 128, 128' extend rearwardly from the rear ends of the platforms 112, 114, respectively, for engagement with the tree T. Thus, the platforms 112, 114 extend outward from the tree T. The standing platform 112, unlike the seat platform 114, includes slats 130 extending between the side members 124A, 124B to form a generally planar top surface on which, for example, the user's feet may rest. Although not shown, the seat platform 114, unlike the standing platform, includes a seat for a user to sit.

Each of the platforms 112, 114 also includes a tree securement mechanism (broadly, a cable device), generally indicated at 131, 131', respectively, for releasably securing the platforms to the tree T. Each tree securement device 130, 130' includes a cable, generally indicated at 132, 132', respectively, for wrapping around the tree T, and a pair of cable-securement members 134, 134', respectively, for releasably securing the corresponding cable to the platform 112, 114. Each cable-securement member 134, 134' is secured to the corresponding platform 112, 114 via a support arm 140, 140' and a rear bracket 142, 142'. The support arms 140, 140' are pivotably secured to one of the side members 124A, 124B and 124A', 124B' of the corresponding platform 112, 114, and the rear brackets 142, 142' are pivotably secured to the respective platforms to allow the cable-securement members 134, 134' to be folded downward relative to the platform into a collapsed configuration (not shown).

In the illustrated embodiment, the cables 132, 132' and the cable-securement members 134, 134' of the platforms 112, 114, respectively, are essentially identical and used in identical ways to secure the platforms to the tree T. Accordingly, for ease of explanation and illustration, only one of the cable-securement members (e.g., cable-securement member 134) of the standing platform 112 is described and illustrated in the drawings, with the understanding that the teachings of this cable-securement member applies equally to each of the cable-securement members of both the standing platform and the seat platform 114.

Referring to FIGS. 13 and 14, the cable 132 and the cable-securement member 134 are similar to the cable 72 and the cable-securement member 73 in the embodiment illustrated in FIGS. 1-11. The cable 132 has first and second end portions (only end portion 132B is shown). The cable 132 comprises an elongate cable body 150, and a plurality of stops, e.g., swages 152A-152D, spaced apart from one other adjacent the first and second end portions of the cable (only second end portion 132B is shown). In an unloaded state, the cable body 150 has a generally linear (i.e., straight) shape. However, the cable body 150 is resiliently deflectable (i.e., resiliently bendable) when a bending load is applied thereto, and is capable of rebounding to substantially its unloaded state when the load is removed. In one example, the cable body 150 may be formed of a braided steel wire, however, other resiliently bendable materials are also within the scope of this invention. The illustrated swages 152A-152D comprise generally cylindrical bodies (e.g., copper bodies) compressed or crimpled around the cable body 150 and spaced apart from one another along the length of the cable body. In the illustrated embodiment, the cable body 150 and the swages 152A-152D are covered in a shrunken heat shrinkable plastic tubing to protect the metallic materials from exposure to the elements. In addition, a plastic protective sheath (not shown) may also be applied to the cable body 150 over the heat shrink, but not the swages 152A-152D.

The cable-securement member 134 has open front and rear longitudinal ends 134A, 134B, a sidewall 160 extending between the front and rear longitudinal ends, and a longitudinal passage 162 extending through the front and rear longitudinal ends. In the illustrated embodiment, the cable-securement member 134 is a tube having a single, round sidewall 160 with a straight rear portion and a curved front portion, although the cable-securement member may have other shapes. A cross-sectional dimension D2 (FIG. 14) of the passage 162 (e.g., inner diameter of tube) is sized and shaped for slidably receiving the second end portion 132B of the cable 132, including the swages 152A-152D. The longitudinal passage 162 has a curved portion 162A (i.e., at least a portion of the passage is curved) adjacent the front longitudinal end 134A, which is curved relative to the portion of the passage adjacent the rear longitudinal end 134B of the cable-securement member 134. In the illustrated embodiment, the curved portion 162A of the longitudinal passage 162 curves in a generally upward direction, although the longitudinal passage may curve in a different direction (e.g., laterally or downward). In the illustrated embodiment, the cable-securement member 134 is welded to a bracket 164 that is in turn bolted to the support 140. The cable-securement member 134 may be secured to the platform 112 in other ways.

Referring to FIG. 14, like the cable-securement member 73 of the prior embodiment, the cable-securement member 134 includes a longitudinal slot 170 in the sidewall 160 and in registration with the curved portion 162A of the longitudinal passage 162. In the illustrated embodiment, the slot 170 extends through the front longitudinal end 134A and toward the second longitudinal end 134B. The slot 170 is sized and shaped to inhibit reception of the swages 152A-152D therein, while allowing the cable body 150 to enter from the curved portion 162A of the longitudinal passage 162. As explained below when describing a method of adjusting the cable 132, the cable automatically locks in position (i.e., a locked position) after one of the swages 152B-152D moves past the slot 170 and through the first longitudinal end 134A of the cable-securement member 134. In general, the location of the longitudinal slot 170 in the sidewall 160 is opposite the direction of the curved portion 162A of the longitudinal passage 162. For example, in the illustrated embodiment, the longitudinal slot 170 is located at a lower portion or underside of the cable-securement member 134 because the curved portion 162A of the longitudinal passage 162 curves upward.

Also similar to the prior embodiment, the cable-securement member 134 also includes an arcuate extension member 174 secured to the exterior of the sidewall 160 in generally opposing relationship with the slot 170. As explained below, the extension member 174 has a front end 174A (i.e., an engagement surface) that one of the swages 152B-152D engages when the cable 132 is in the locked position (FIGS. 13 and 14). In the illustrated embodiment, the extension member 174 comprises a metal plate curved to a suitable radius of curvature for engaging the one of the swages 152B-152D when the cable 132 is in the locked position. The extension member 174 may be welded to the cable-securement member 134, or otherwise attached thereto, so that the extension member extends over and covers less than the entire length of the slot 170 (i.e., the extension member covers only a longitudinal portion of the slot). In another embodiment, the cable-securement member 134 does not include the extension member 174.

The effective length of the cable 132 can be adjusted to secure the platform 112 to the tree T in a manner similar to that used in the prior embodiment to adjust the angle A at which the platform 15 extends from the brace 17. That is, the cable 132 can be passed around the tree T and one or both of the cable end portions 132B can be moved forward through the cable-securement member 132 so that one of the swages 152B-152D moves past the slot 170 and through the first longitudinal end 134A, whereby the cable 132 automatically rebounds and the cable body 150 (i.e., the portion of the cable body between two adjacent swages) exits the curved portion 162A of the passage 162 through the longitudinal slot. As shown in FIG. 14, in this position the cable 132 is locked, and any rearward force or movement of the cable will cause a rear end of the swage 152B to contact the exterior of sidewall 160 of the cable-securement member 134 and the contact surface 174A of the arcuate extension 174. Thus, in the locked position, the cable 132 is inhibited from moving rearward relative to the cable-securement member 134.

To reduce the effective length of the cable 132 and tighten the cable around the tree T, one or both ends 132B of the cable is moved forward in the corresponding longitudinal passage 162 so that the next swage (e.g., swage 152C) slides past the longitudinal slot 170 and exits the open front longitudinal end 134A of the cable-securement member 134. After the swage (e.g., swage 152C) exits the front longitudinal end 134A, the cable 132 automatically rebounds so that the cable body 150 (i.e., the portion of the cable body between adjacent swages) exits the curved portion 162A laterally through the longitudinal slot 170. Each successive swage 152C-152D reduces the effective length of cable 132, thus allowing the platform 112 to be secured to trees T of different diameters.

To loosen the cable 132 from the tree T, at least one of the second end portions 132D of the cable that is outside the cable-securement member 134 is moved forward so that the engaged swage 152B-152D is forward of the longitudinal slot 170. Then the cable 134 is manually deflected so that the portion of the cable body 150 between the two adjacent swages 152B-152D is inserted back into the passage 162 through the longitudinal slot 170. The cable 132 can be pulled rearward through the passage 162 to allow another swage 152B-152D to engage the sidewall 160 of the cable-securement member 134 and the extension member 174.

Other than the tightening and loosening of the cables 132, 132' around the tree T, the climbing tree stand 110 may be used in a conventional manner, generally known to those of ordinary skill in the art.

Having described the invention in detail, it will be apparent that modifications and variations are possible without departing from the scope of the invention defined in the appended claims. For example, for either of the embodiments described above, the number of swages spaced along the end of the cable is not limited to five.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A tree stand adapted for securement to a tree, the tree stand comprising:
   a platform having opposite front and rear ends and opposite first and second sides;
   a brace pivotally secured to the platform;
   a cable for securing the platform to the brace at an angle relative to the brace, the cable including
      an elongate cable body having opposite first and second end portions, the cable body being resiliently bendable, and
      at least one stop on the cable body adjacent the second end portion of the cable body; and
   a cable-securement member secured to the platform adjacent the second side of the platform, the cable-securement member including
      first and second opposite longitudinal ends,
      a sidewall extending between the first and second longitudinal ends,
      a longitudinal passage extending through the first and second longitudinal ends and sized and shaped for allowing the cable to move through the longitudinal passage from the first longitudinal end to the second longitudinal end, the longitudinal passage having a curved portion adjacent the second longitudinal end configured to resiliently bend the cable body as the cable enters the curved portion, and
      a longitudinal slot in the sidewall of the curved portion of the longitudinal passage, the slot configured to inhibit reception of the stop therein, and to allow the cable body to enter the slot from the curved portion of the longitudinal passage, wherein the cable is configured to automatically rebound toward its unloaded state in the curved portion as the stop moves past the slot and exits the passage through the second longitudinal end so that the cable body exits the curved portion through the longitudinal slot and the stop is engageable with the cable-securement member to releasably lock the cable relative to the cable securement member;
   wherein the cable-securement member comprises a conduit having a length, the conduit being curved along its length at the curved portion of the longitudinal passage.

2. The tree stand set forth in claim 1, wherein the at least one stop comprises a plurality of stops spaced apart from one another along the length of the cable body adjacent the second end portion of the cable body for adjusting the angle at which the platform extends from the brace.

3. The tree stand set forth in claim 2 further comprising a guide secured to the brace, wherein the cable extends through the guide.

4. The tree stand set forth in claim 3, wherein the guide comprises a curved conduit.

5. The tree stand set forth in claim 3, wherein the first end portion of the cable is pivotably secured to the platform adjacent the first side of the platform.

6. The tree stand set forth in claim 1 further comprising a seat secured to the brace.

7. A tree stand adapted for securement to a tree, the tree stand comprising:
   a platform having opposite front and rear ends and opposite first and second sides;
   a cable for securing the platform to the tree, the cable including
      an elongate cable body having opposite first and second end portions, the cable body being resiliently bendable from an unloaded state, and
      at least one stop on the cable body adjacent the second end portion of the cable body; and
   a cable-securement member secured to the platform adjacent the second side of the platform, the cable-securement member including
      first and second longitudinal ends,
      a sidewall extending between the first and second longitudinal ends,
      a longitudinal passage extending through the first and second longitudinal ends and sized and shaped for allowing the cable to move through the longitudinal passage from the first longitudinal end to the second longitudinal end, the longitudinal passage having a curved portion adjacent the second longitudinal end configured to resiliently bend the cable body as the cable enters the curved portion, and
      a longitudinal slot in the sidewall of the curved portion of the longitudinal passage, the slot configured to inhibit reception of the stop therein, and to allow the cable body to enter the slot from the curved portion of the longitudinal passage, wherein the cable is configured to automatically rebound toward its unloaded state in the curved portion as the stop moves past the slot and exits the passage through the second longitudinal end so that the cable body exits the curved portion through the longitudinal slot and the stop is engageable with the cable-securement member to releasably lock the cable relative to the cable securement member;
   wherein the cable-securement member comprises a conduit having a length, the conduit being curved along its length at the curved portion of the longitudinal passage.

8. The tree stand set forth in claim 7, wherein the at least one stop comprises a plurality of stops spaced apart from one another along the length of the cable body adjacent the second end portion of the cable body for use in securing the tree stand to trees of different diameters.

9. The tree stand set forth in claim 8, wherein the cable includes at least one additional stop on the cable body adjacent the first end portion of the cable body, the tree stand further comprising a second cable-securement member secured to the platform adjacent the first side of the platform, the second cable-securement member including
   opposite first and second longitudinal ends,
   a sidewall extending between the first and second longitudinal ends,
   a longitudinal passage extending through the first and second longitudinal ends and sized and shaped for allowing the first end portion of the cable to move through the longitudinal passage from the first longitudinal end to the second longitudinal end, the longitudinal passage having a curved portion adjacent the second longitudinal end configured to resiliently bend the first end portion of the cable body as the first end portion of the cable enters the curved portion, and
   a longitudinal slot in the sidewall of the curved portion of the longitudinal passage, the slot configured to inhibit reception of the stop therein, and to allow the cable body to enter the slot from the curved portion of the longitudinal passage, wherein the cable is configured to automatically rebound toward its unloaded state in the curved portion as the stop moves past the slot and exits the passage through the second longitudinal end so that the cable body exits the curved portion through the longitudinal slot and the stop is engageable with the cable-securement member to releasably lock the cable relative to the cable securement member.

10. The tree stand set forth in claim 9, wherein the at least one additional stop on the cable body adjacent the first end portion of the cable body comprises a plurality of stops spaced apart from one another along the length of the cable.

11. The tree stand set forth in claim 7, wherein the platform includes a plurality of slats, each slat extending between the first and second sides of the platform.

12. The tree stand set forth in claim 7, wherein the platform defines an open area confined by the front and rear ends and the first and second sides.

13. A cable device for use with a tree stand having a platform with front and rear ends and first and second sides, the cable device comprising:
   a cable configured to extend from the first side to the second side of the platform, the cable including
      an elongate cable body having opposite first and second end portions, the cable body being resiliently bendable, and
      at least one stop on the cable body adjacent at least the second end portion of the cable body; and
   a cable-securement member for securement to the platform adjacent the second side of the platform, the cable-securement member including
      opposite first and second longitudinal ends,
      a sidewall extending between the first and second longitudinal ends,
      a longitudinal passage extending through the first and second longitudinal ends and sized and shaped for allowing the cable to move through the longitudinal passage from the first longitudinal end to the second longitudinal end, the longitudinal passage having a curved portion adjacent the second longitudinal end configured to resiliently bend the cable body as the cable enters the curved portion, and
      a longitudinal slot in the sidewall of the curved portion of the longitudinal passage, the slot configured to inhibit reception of the stop therein, and to allow the cable body to enter the slot from the curved portion of the longitudinal passage, wherein the cable is configured to automatically rebound toward its unloaded state in the curved portion as the stop moves past the slot and exits the passage through the second longitudinal end so that the cable body exits the curved portion through the longitudinal slot and the stop is engageable with the cable-securement member to releasably lock the cable relative to the cable-securement member;
   wherein the cable-securement member comprises a conduit having a length, the conduit being curved along its length at the curved portion of the longitudinal passage.

* * * * *